(12) United States Patent
Suzuki et al.

(10) Patent No.: US 11,440,054 B2
(45) Date of Patent: Sep. 13, 2022

(54) CONVEYANCE SYSTEM

(71) Applicant: Yahata Holdings Corporation, Kitanagoya (JP)

(72) Inventors: Noriyuki Suzuki, Kitanagoya (JP); Kyuichi Nishizato, Kitanagoya (JP)

(73) Assignee: YAHATA HOLDINGS CORPORATION, Kitanagoya (JP)

( * ) Notice: Subject to any disclaimer, the term of this patent is extended or adjusted under 35 U.S.C. 154(b) by 39 days.

(21) Appl. No.: 17/136,399

(22) Filed: Dec. 29, 2020

(65) Prior Publication Data

US 2021/0362195 A1 Nov. 25, 2021

(30) Foreign Application Priority Data

May 19, 2020 (JP) .............................. JP2020-087393
Dec. 16, 2020 (JP) .............................. JP2020-208148

(51) Int. Cl.

| | |
|---|---|
| *B07C 5/16* | (2006.01) |
| *B65G 43/08* | (2006.01) |
| *B07C 5/34* | (2006.01) |
| *B65G 47/50* | (2006.01) |
| *B65G 1/137* | (2006.01) |

(52) U.S. Cl.
CPC .............. *B07C 5/16* (2013.01); *B07C 5/3412* (2013.01); *B65G 43/08* (2013.01); *B65G 47/50* (2013.01); *B65G 1/137* (2013.01); *B65G 2203/0216* (2013.01); *B65G 2203/0258* (2013.01)

(58) Field of Classification Search
CPC ......... B07C 5/16; B07C 5/3412; B65G 43/08; B65G 47/50; B65G 47/503; B65G 1/137; B65G 1/1373; B65G 2203/0216; B65G 2203/0258

USPC .......................... 198/358, 349; 414/266, 273
See application file for complete search history.

(56) References Cited

U.S. PATENT DOCUMENTS

| | | | | |
|---|---|---|---|---|
| 4,053,741 A * | 10/1977 | Ainoya | .................. | B23Q 41/06 198/465.2 |
| 5,293,983 A * | 3/1994 | Grapes | .................... | B07C 3/082 209/900 |
| 8,499,920 B2 * | 8/2013 | Ogawa | .................. | B65G 43/08 198/370.01 |
| 8,622,194 B2 * | 1/2014 | DeWitt | ................... | B61B 13/02 198/347.1 |
| 9,688,479 B1 * | 6/2017 | Gorski | ................. | G06Q 10/087 |
| 2016/0075512 A1 * | 3/2016 | Lert, Jr. | ................. | B65G 1/065 414/273 |

(Continued)

FOREIGN PATENT DOCUMENTS

| | | |
|---|---|---|
| JP | 9-71321 A | 3/1997 |
| JP | 2020-19596 A | 2/2020 |

*Primary Examiner* — James R Bidwell
(74) *Attorney, Agent, or Firm* — WHDA, LLP (57) ABSTRACT

A conveyance system includes a feeding device, a reading device, a weight measuring device, a storage device, a notification device, and an arithmetic control device which compares the number of pickings of the articles obtained by dividing a difference between the reference weight value and a measurement value after operation as a weight of the container after picking of the articles by the unit weight, with the number of incoming orders, determines whether there is an excess or deficiency, and when there is an excess or deficiency, notifies the excessive or deficient number of articles by the notification device.

3 Claims, 10 Drawing Sheets

(56) References Cited

U.S. PATENT DOCUMENTS

2016/0176655 A1\* 6/2016 Stitt .................... B65G 47/766
198/358
2018/0029797 A1\* 2/2018 Hance ................. B65G 1/0492

\* cited by examiner

| Identification information assigned to article G | | |
|---|---|---|
| General | Item code as article G | |
| | Trade name | |
| | Price | |
| | Shipping destination | |
| | Number of incoming orders (number of orders placed) | |
| | Category (merchandise classification) | |
| | Maximum number of shipments determined in consideration of variation in merchandise | |
| Retailing | Sales area of store | |
| | Aisle number | |
| | Gondola number | |
| | Shelf position in store display | |
| | Number in order of arrangement | |
| Production plant | Plant name | |
| | Reception opening number | |
| | Line number | |
| | Assembly number | |
| | Part number as article G | |
| | Number in order of assembling | |
| | Number in order of use of the part (number in order of use in process, etc.) | |
| | Quantity | |
| | | |

FIG. 7

| Identification information assigned to container BC | Identification number information of container BC | |
|---|---|---|
| | Weight of container BC | |
| | Articles G to be stored | |
| | | |

FIG. 8

| | Weight of container BC itself | |
|---|---|---|
| | Weight (reference weight value) of container BC storing articles G before picking of the articles G | |
| Information to be stored in storage unit 43 | Weight (measurement value after operation) of container BC storing articles G after picking of the articles G | |
| | Difference between weights of container BC storing articles G before and after picking of the articles G | |
| | Calculated number of articles calculated by dividing the difference between weights of container BC storing articles G before and after picking of the articles G by the registered unit weight | |
| | | |

CONVEYANCE SYSTEM

BACKGROUND OF INVENTION

Field of Invention

The present invention relates to a conveyance system capable of performing counting management and sorting of articles.

Description of Related Art

As a conventional shipment conveyance system (a conveyance system), there is one described in JP No. H09-71321 A. According to this system, data on ordered articles is divided by each shipping destination, and divided data is created by further dividing the articles divided by shipping destination into shipping units, and then the divided data is assigned to a plurality of chutes respectively that store actual articles during conveyance, and when the divided data remains even after being assigned to all of the chutes, after the remaining divided data is assigned to chutes that become empty sequentially based on a conveyance simulation, the actual articles are conveyed so as to be stored in the respective chutes to which the divided data is assigned in advance.

SUMMARY OF INVENTION

However, in the shipment conveyance system described above, since articles and shipping quantity must be checked through a process in which each article is placed on a line after an operator picks articles from a branched line and reads barcodes attached to the articles in a picking area, when a picking failure occurs, there is a risk of feeding articles to a subsequent process without correction of the failure.

In view of the circumstances described above, the present invention provides a conveyance system capable of preventing articles from being fed to a subsequent process without correction of a picking failure.

According to this, even if the number of pickings is excessive or deficient, the abnormality can be notified by double-checking by weight measurement, so that the articles can be prevented from being fed to the subsequent process while the abnormality remains.

In the container, articles of the same kind are stored.

According to this, articles of the same kind are stored in the container, and it is unnecessary to individually read barcodes attached to the articles, so that operation man-hours and the operation time can be reduced, and the picking operation time can be shortened. In addition, upon eliminating an article mistake by attaching, for example, a barcode associated with article-related information to the container storing articles of the same kind, the number of pickings can be prevented from becoming excessive or deficient. Further, since, for example, a barcode is attached to the container, picking of the articles to which barcodes cannot be attached can also be performed. Further, the above conveyance system reduces the work man-hours and operation time significantly since it enables an operator to confirm whether the picked article is a desired one and whether he has picked a necessary number of the articles, without any work on a computer constituting the conveyance system, such as touching a scanner or data entry by touching a keyboard or display.

To a region in which the articles are picked in the feeding means, a roller conveyor is applied, and below the roller conveyor, a lifting and lowering means that lifts and lowers the weight measuring means is disposed.

a support portion capable of advancing and retreating at a portion between rollers of the roller conveyor, and capable of supporting the container, is provided to extend at an upper surface side of the weight measuring means, and the arithmetic control means lifts the weight measuring means by the lifting and lowering means before picking of the articles from the container, and the weight measuring means measures weights of the container before and after picking of the articles at an upper side of the roller conveyor.

According to this, by the configuration in which the weight of the container is measured at an upper side of the roller conveyor, without adding special equipment to the roller conveyor, weights of the container before and after picking of the articles can be measured by a combination of existing equipment, so that the equipment investment cost can be reduced while the counting accuracy is improved.

DETAILED DESCRIPTION OF INVENTION

An embodiment of a conveyance system according to the present invention is described based on the drawings.

A conveyance system 10 includes, as shown in FIGS. 1 to 5, a server 20, an operation management computer 30, balance management computers 40, a conveyor line 60 as a feeding means, barcode readers 50 as reading means, electronic balances 120 as weight measuring means, and lifters 110 as lifting and lowering means, and generally, counts picked articles G based on weights of the articles G stored in a container BC measured by the electronic balances 120 and a unit weight of the articles G, and notifies an abnormality.

Figure 5:
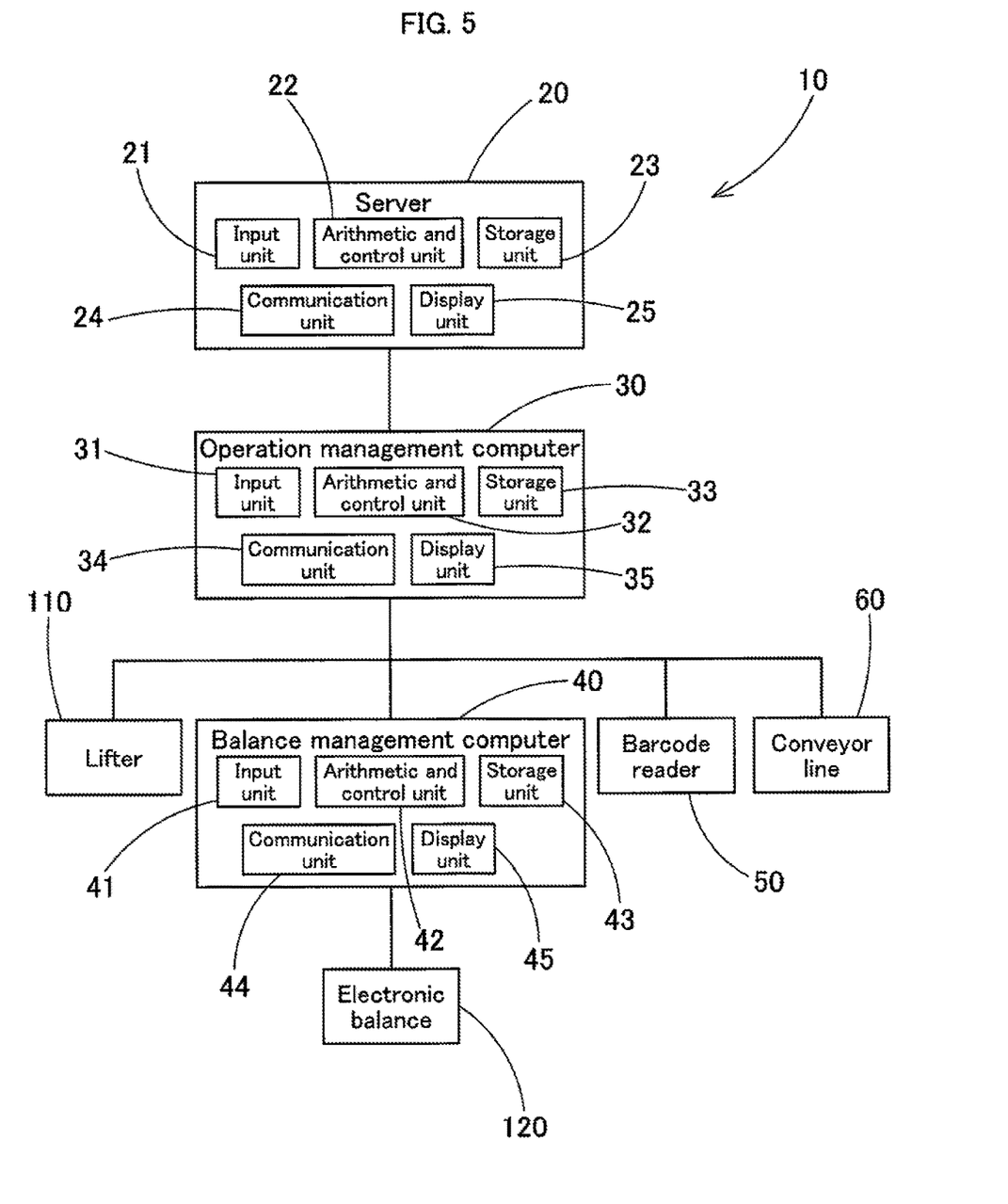
FIG. 5 is a block diagram of the same embodiment.

The server 20 includes an input unit 21, an arithmetic and control unit 22, a storage unit 23, a communication unit 24, and a display unit 25. The input unit 21 consists of a mouse, a keyboard, etc. The arithmetic and control unit 22 consists of a CPU, a RAM, a ROM, etc. The storage unit 23 consists of a semiconductor memory, a hard disk drive, a compact disk drive, etc. The display unit 25 consists of a liquid crystal display, etc. The communication unit 24 consists of a communication interface, an input/output interface, etc., and is connected to the operation management computer 30 through a communication line.

The operation management computer 30 includes an input unit 31, an arithmetic and control unit 32, a storage unit 33, a communication unit 34, and a display unit 35.

The input unit 31 consists of a mouse, a keyboard, etc. The arithmetic and control unit 32 consists of a CPU, a RAM, a ROM, etc. The storage unit 33 consists of a semiconductor memory, a hard disk drive, a compact disk drive, etc. The display unit 35 consists of a liquid crystal display, etc. The communication unit 34 is for communication with the server 20, the balance management computers 40, the conveyor line 60, the barcode readers 50, and the lifters 110 through a communication line.

The balance management computer 40 includes an input unit 41, an arithmetic and control unit 42, a storage unit 43, a communication unit 44, and a display unit 45.

The input unit 41 consists of a mouse, a keyboard, etc. The arithmetic and control unit 42 consists of a CPU, a RAM, a ROM, etc. The storage unit 43 consists of a semiconductor memory, a hard disk drive, a compact disk drive, etc. The display unit 45 consists of a liquid crystal display, etc. The communication unit 44 is for communication with the operation management computer 30 and the electronic balances 120 through a communication line.

As the barcode readers 50, existing barcode readers are used, and are connected to the operation management computer 30 and are capable of reading barcodes B (refer to FIGS. 2 and 3) assigned to the containers BC.

Figure 1:
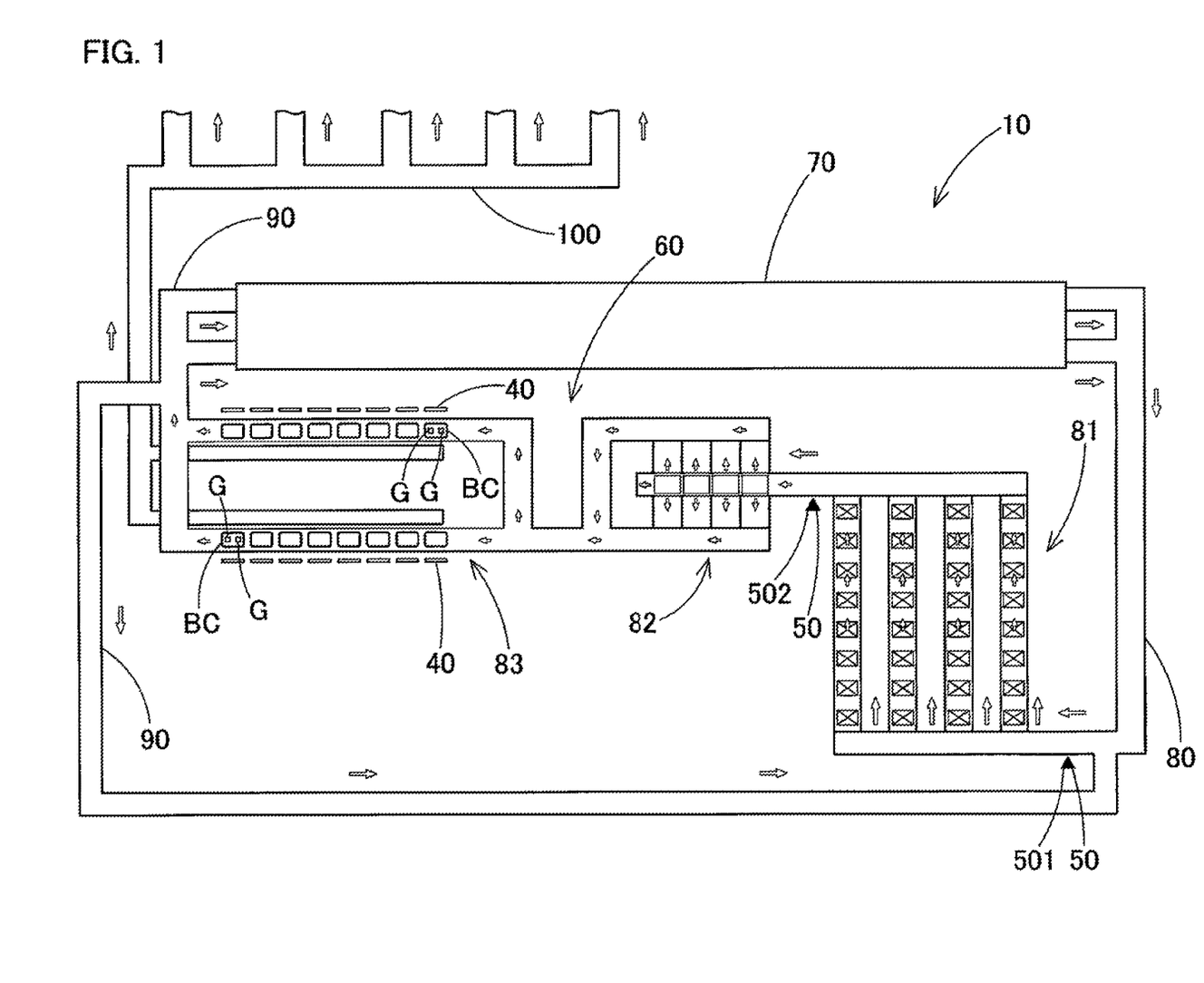
FIG. 1 is a schematic configuration diagram of a conveyance system according to an embodiment of the present invention.
Figure 2:
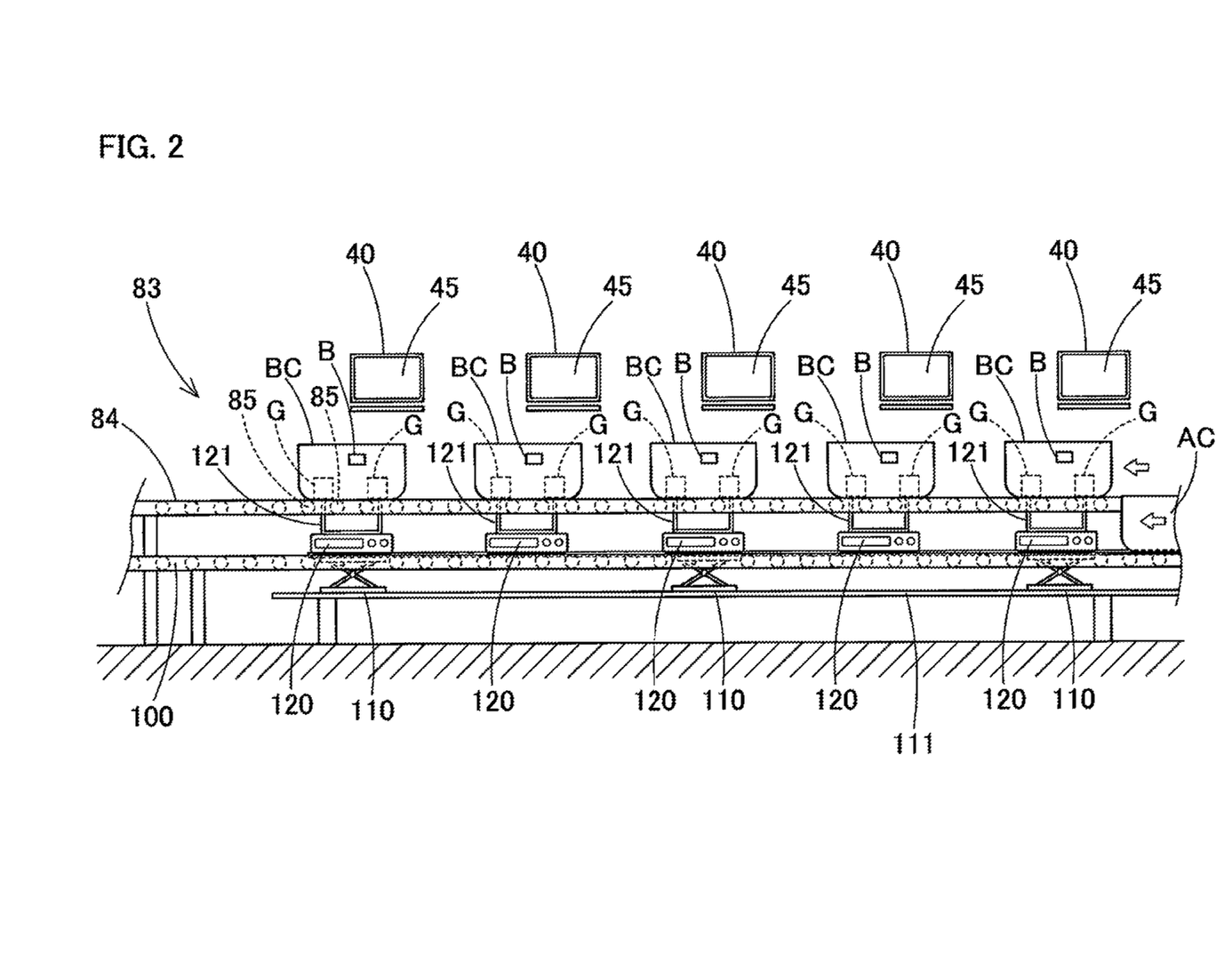
FIG. 2 is an explanatory view of the same embodiment showing a state before electronic balances are lifted, as viewed from a direction orthogonal to a feeding direction of a picking section.
Figure 3:
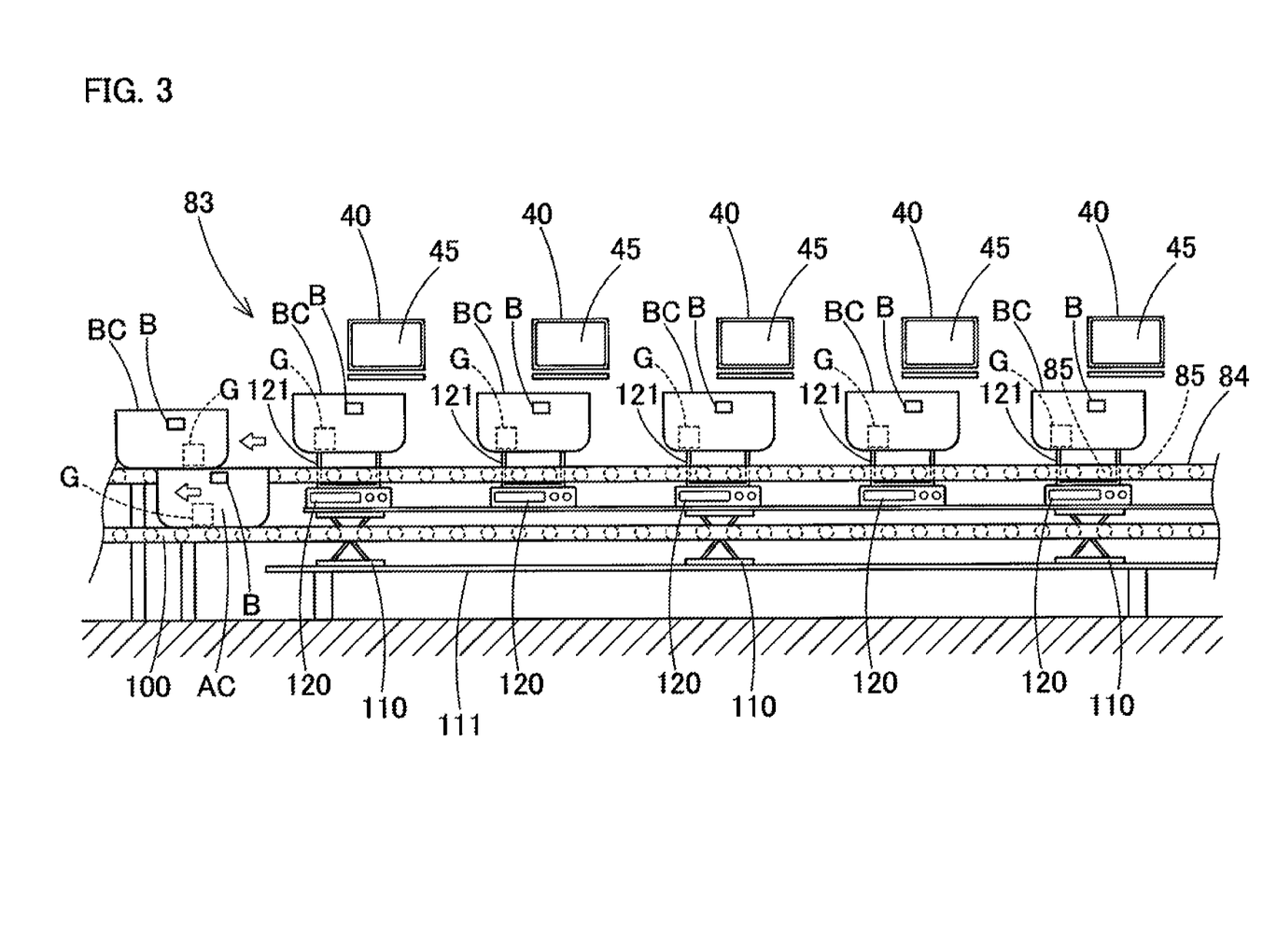
FIG. 3 is an explanatory view of the same embodiment showing a state where the electronic balances are lifted, as viewed from the direction orthogonal to the feeding direction of the picking section.
Figure 4A:
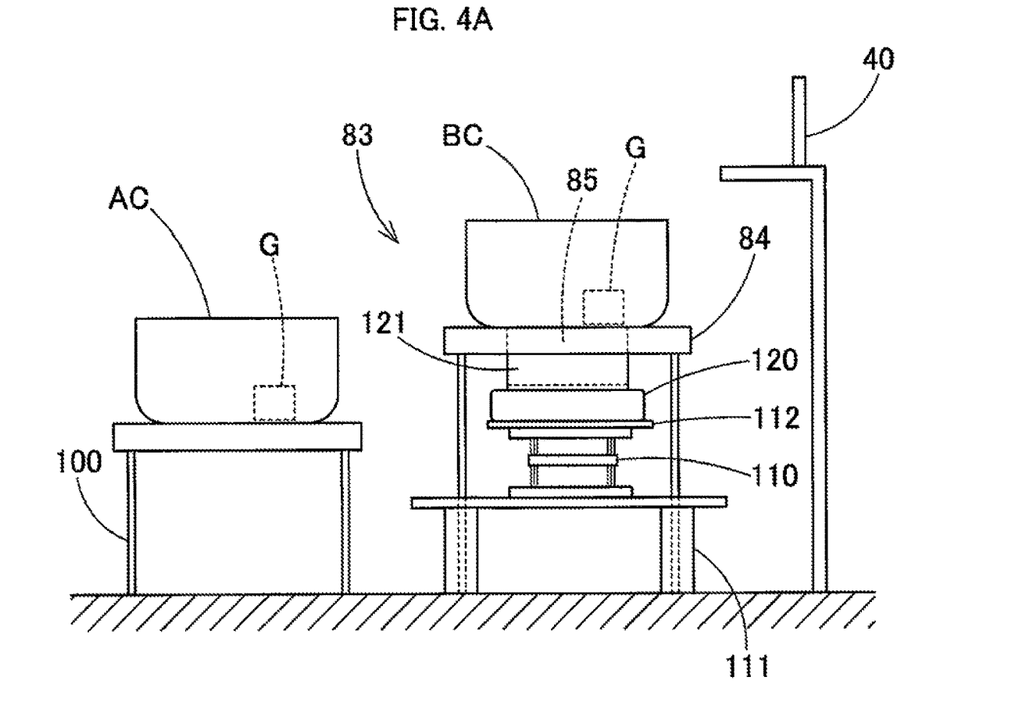
FIG. 4A is an explanatory view of the same embodiment as viewed from the feeding direction of the picking section, corresponding to FIG. 2.
Figure 4B:
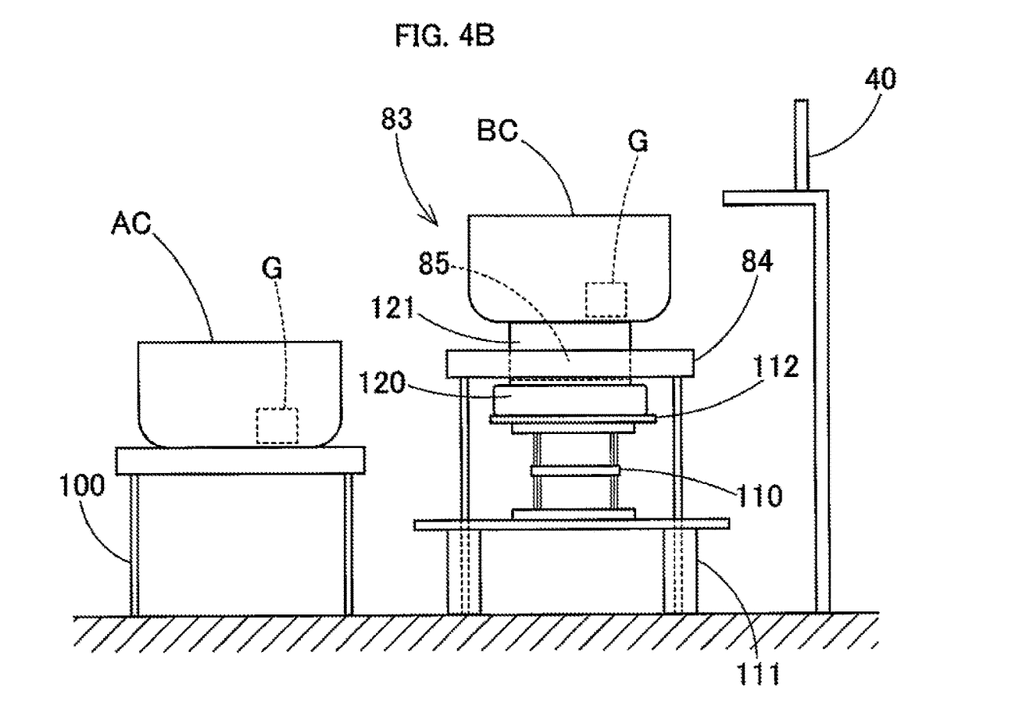
FIG. 4B is an explanatory view of the same embodiment as viewed from the feeding direction of the picking section, corresponding to FIG. 3.

The conveyor line 60 as a feeding means includes, as shown in FIG. 1, an automated warehouse 70, a first feed line 80 that feeds articles G from the automated warehouse 70 to a picking section 83, a second feed line 90 that feeds articles G from the picking section 83 to the automated warehouse 70 or a waiting section 81, and a loading line 100 that feeds articles G to a loading area for loading onto a vehicle.

Although not shown in detail in the drawings, as the automated warehouse 70, an existing one including a plurality of storage shelves for storing the articles G and shuttles for taking in and out the articles G is used, and the automated warehouse 70 is connected to the first feed line 80 and the second feed line 90 and configured to store and dispatch the articles G as shown in FIG. 1.

The first feed line 80, the second feed line 90, and the loading line 100 are configured to include, as shown in FIGS. 1 to 4B, a plurality of existing roller conveyors, and branch units not shown in the drawings disposed at corners, three-way and four-way junctions, etc.

In the first feed line 80, the second feed line 90, and the loading line 100, a plurality of sensors not shown in the drawings that consist of optical sensors and are capable of recognizing the articles G are disposed, and can acquire position information of the articles G in the conveyor line 60.

In addition, in the first feed line 80, the second feed line 90, and the loading line 100, a plurality of barcode readers 50 (referred to as barcode readers 501 and 502 when they need to be distinguished) are disposed. In the present embodiment, the barcode readers 50 related to the present invention are shown by black triangles in FIG. 1, and can read identification number information of the articles G assigned to the containers BC, and are disposed at two points.

To the first feed line 80, the second feed line 90, and the loading line 100, line addresses are assigned for each region in which each sensor is disposed, and are configured so that the server 20 grasps line addresses at which the articles G locate in real time. The first feed line 80, the second feed line 90, and the loading line 100 can stop and move the articles G at the respective line addresses.

The first feed line 80 includes, as shown in FIG. 1, the waiting section 81, an alignment section 82, and the picking section 83.

The waiting section 81 consists of four parallel conveyors as shown in FIG. 1.

The waiting section 81 is disposed at the downstream side of the automated warehouse 70 in the feeding direction of the articles G, and the articles G fed from the automated warehouse 70 temporarily wait in each row.

In the present embodiment, the waiting section 81 causes the articles G put in the containers BC with barcodes B (refer to FIGS. 2 and 3) read by the barcode reader 501 and grouped into rows to wait in random order, and feeds articles G on a group-by-group basis to the downstream side in the feeding direction.

The alignment section 82 includes, as shown in FIG. 1, a branch unit and sensors capable of recognizing positions of the articles G, and can align the containers BC with barcodes B (refer to FIGS. 2 and 3) read by the barcode reader 502 in descending order for each shipping destination in units of picking batches of the articles G.

As shown in FIGS. 1 to 4B, the picking section 83 consists of a plurality of existing roller conveyors, and can stop the containers BC at positions corresponding to line addresses so that the articles G can be picked by an operator.

In the present embodiment, the alignment section 82 can align the eight containers BC, so that the eight containers BC waiting for picking in the picking section 83 are included in one row. Thus, a batch to be discharged to a conveyor of one row in the waiting section 81 from the automated warehouse 70 consists of the eight containers BC. The discharged containers are arranged in four rows in the waiting section 81 shown in FIG. 1. The containers are separated in units of eight in order of shipping instructions of the server 20, and the eight containers are set as a batch unit, and are fed in random order to the conveyors of the respective rows in the waiting section 81. The waiting section 81 is configured so that the eight containers BC in random order are aligned in order by the alignment section 82, and fed to the picking section 83.

As shown in FIG. 1, the second feed line 90 is disposed at the downstream side of the picking section 83 of the first feed line 80 in the feeding direction, and is configured so that the containers BC from which articles G were picked can be moved to the automated warehouse 70 or the waiting section 81.

As shown in FIGS. 1 to 4B, the loading line 100 has a start end disposed at a lower side of the picking section 83 of the first feed line 80, and is disposed substantially parallel to the picking section 83, and can feed storage containers AC storing the articles G to an area for loading onto a vehicle.

As lifting and lowering means, a plurality of existing lifters 110 are used and, as shown in FIGS. 2 to 4B, mounted on a machine table 111 disposed at a lower side of the picking section 83 and disposed along a feeding direction of the articles G. One plate member 112 is laid across upper portions of the plurality of lifters 110, and a plurality of electronic balances 120 are attached to an upper surface of the plate member 112.

As the electronic balances 120, existing electronic balances are used, and as shown in FIGS. 2 to 4B, main body portions are disposed at positions at the lower side of the picking section 83 and corresponding to the line addresses. A plurality of support portions 121 having U-shaped sections are provided to extend upward on upper surface portions of the electronic balances 120 on which the articles G are placed.

The support portions 121 are shaped so as to advance and retreat in an up-down direction at portions between rollers 85 of a roller conveyor 84 constituting the picking section 83, and enable weighing of the containers BC by the electronic balances 120 by supporting the containers BC.

Information to be stored in the storage unit 23 includes article-related information consisting of identification information assigned to the articles G and identification information assigned to the containers BC.

Figure 6:
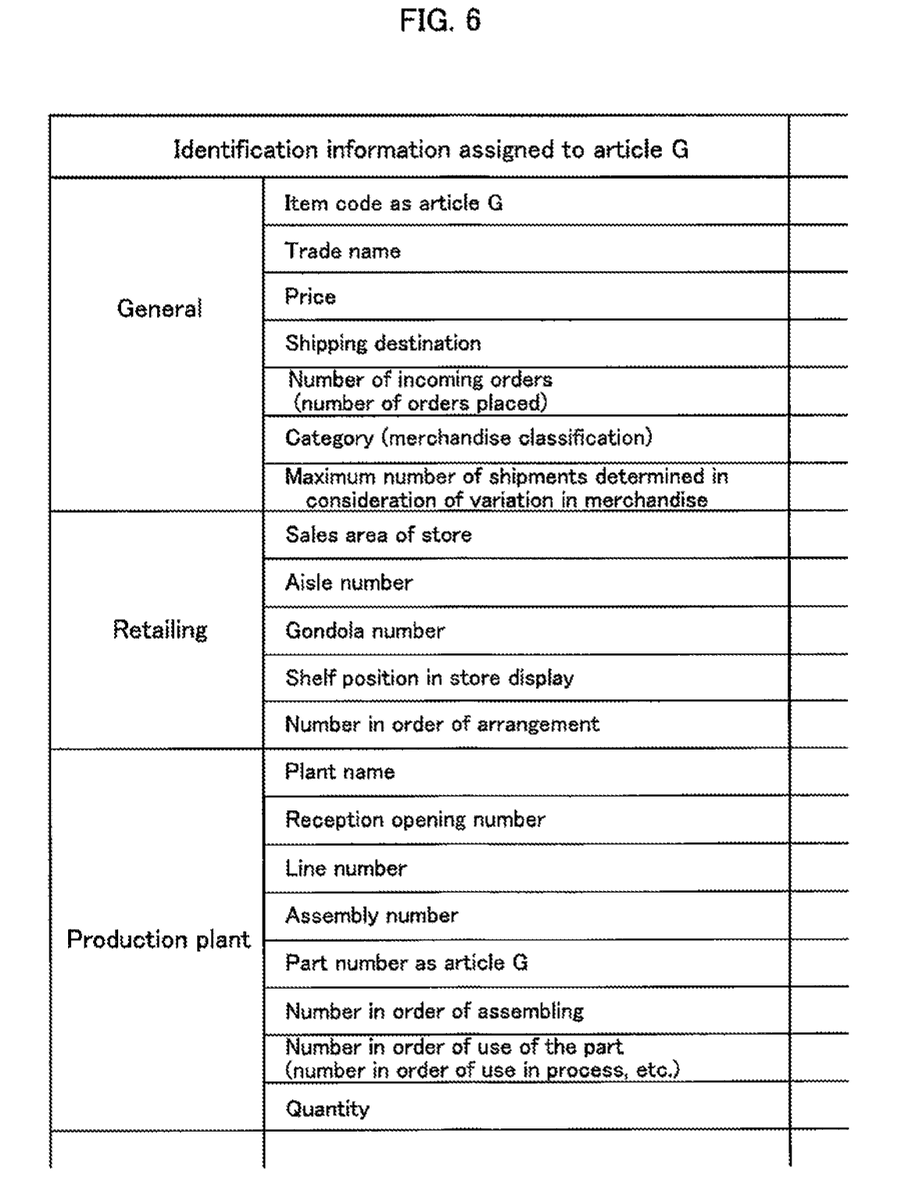
FIG. 6 is a schematic explanatory table of identification information to be assigned to an article G and stored in a storage unit 23 of the same embodiment.

Identification information to be assigned to an article G is generally, as shown in FIG. 6, an item code as the article G, a trade name, a price, a shipping destination, the number of incoming orders (the number of orders placed), a category (merchandise classification), a maximum number of shipments determined in consideration of variation in merchandise (refer to the counting system in Japanese Patent Application No. 2019-126633 previously filed by the applicant of the present invention), and for example, in the case of retailing, a sales area of a store, an aisle number, a gondola number, a shelf position in store display, and a number in order of arrangement, etc., and in a production plant, a plant name, a reception opening number, a line number, an assembly number, a part number as the article G, a number in order of assembling, and a number in order of use of the part (number in order of use in process, etc.), and quantity, etc.

Other information including a registered unit weight is associated with an item code of one article G.

Figure 7:
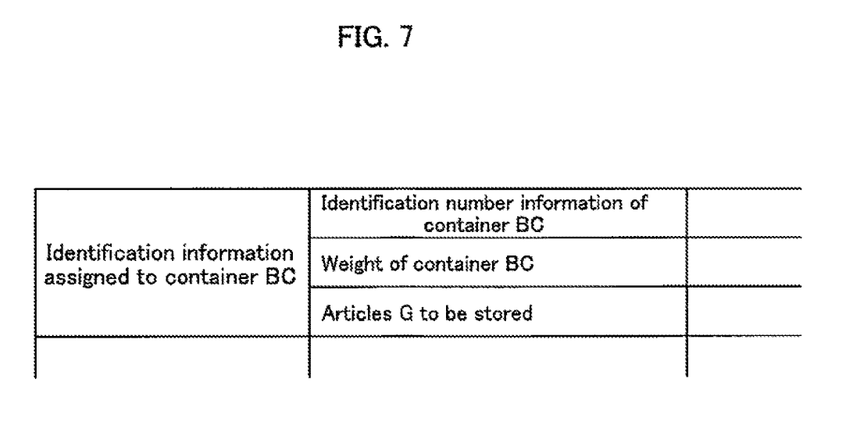
FIG. 7 is a schematic explanatory table of identification information to be assigned to a container BC and stored in the storage unit 23 of the same embodiment.

Identification information to be assigned to the container BC is, as shown in FIG. 7, identification number information of the container BC, a weight of the container BC, and the articles G to be stored.

The identification information of the container BC and the identification information of the article G are associated and recorded as a barcode B (refer to FIGS. 2 and 3), and the identification information of the container BC and the identification information of the article G are read by the barcode readers 50.

"Article-related information is assigned" in the present specification includes, in addition to attachment of article-related information to the container BC, etc., that stores the article G, printing and attachment of the article-related information onto the article G.

Figure 8:
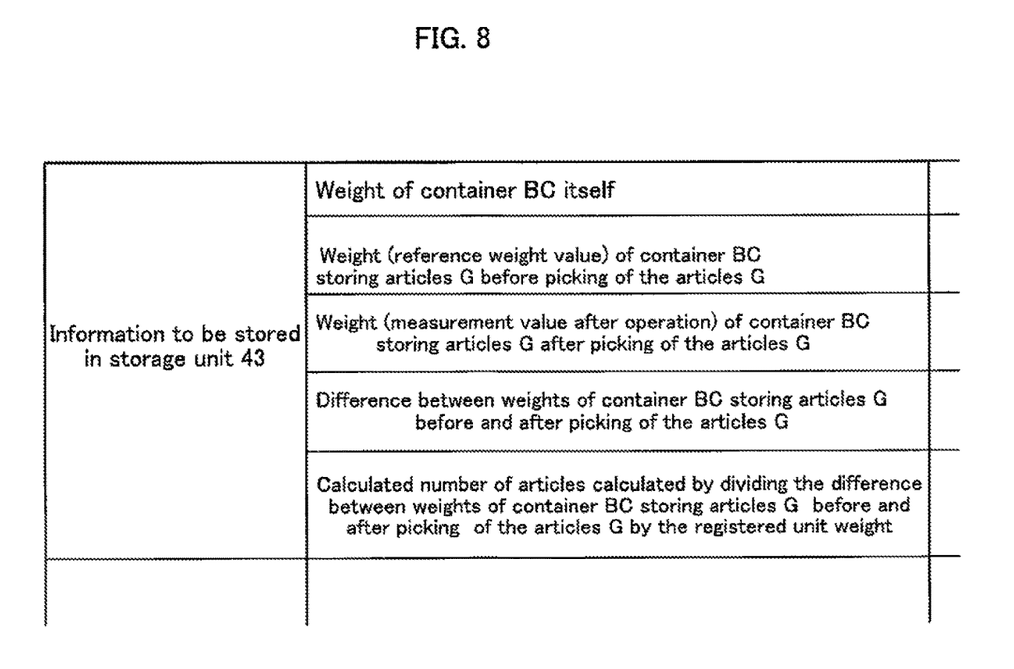
FIG. 8 is a schematic explanatory table of information to be stored in a storage unit 43 of the same embodiment.

Information to be stored in the storage unit 43 is, as shown in FIG. 8, a weight of the container BC itself, a weight (reference weight value) of the container BC storing the articles G before picking of the articles G, a weight (measurement value after operation) of the container BC storing the articles G after picking of the articles G, a difference between weights of the container BC storing the articles G before and after picking of the articles G, and a calculated number of articles calculated by dividing the difference between weights of the container BC storing the articles G before and after picking of the articles G by the registered unit weight, etc., and these are temporarily stored in the storage unit 43, and the measurement values and calculated values are transmitted to the operation management computer 30 and erased from the storage unit 43.

Functions and effects in the present embodiment are described. The weight of the container BC is stored in the storage unit 23 in advance, and when putting merchandise into the automated warehouse 70, the weight of the container BC and a weight when articles G are put in the container are associated with barcode B attached to the container BC, and the weight when articles are put in the container is stored as a reference weight value in the storage unit 23 of the server 20. At this time, a weight (unit weight) of a minimum unit of the articles G to be picked has been registered in advance.

When the above-described information is not stored, a unit weight of the articles G is stored at the time of warehousing, a total weight of the articles G is divided by the unit weight to calculate the number of articles, and at the time of warehousing, whether the calculated number matches an actual number is checked and stored in the storage unit 23 of the server 20, and the articles are put into the automated warehouse 70. When the numbers do not match, correction is made for data consistency, and the weight is stored as a reference weight value in the storage unit 23 of the server 20 and the articles are put into the automated warehouse 70.

Figure 9:
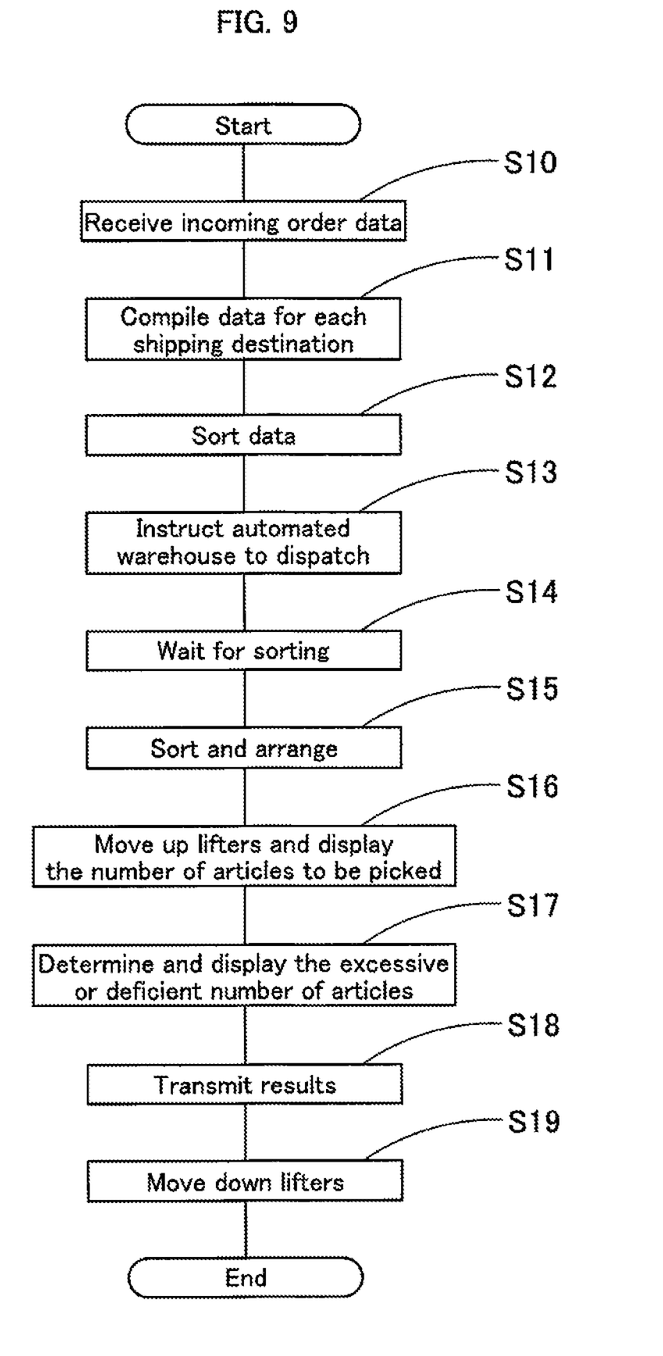
FIG. 9 is a flowchart showing operation steps of the same embodiment.

As shown in FIG. 9, the server 20 receives incoming order data (S10), and compiles the data for each shipping destination (S11). The server 20 sorts the data in reverse order of customer's request for each shipping destination according to shipping (S12). The server 20 separates the containers by the number of locatable containers in the picking section 83, and through the operation management computer 30, instructs the automated warehouse 70 to dispatch the containers in units of batches each corresponding to the number of locatable containers (S13). The containers BC dispatched from the warehouse are distributed to the first feed line 80 in units of batches, and barcodes B are read by the barcode reader 501, and the containers are sorted into separated rows in units of batches and wait in the waiting section 81 (S14).

Then, when all of the containers BC of one batch unit are dispatched from the warehouse, the server 20 instructs to feed the containers BC to the alignment section 82, read barcodes B by the barcode reader 502, sort and arrange the containers in an instructed order, and feed the containers to the picking section 83 through the operation management computer 30 (S15).

At this time, when there is no incoming order data, the server 20 ends the above-described processing, and when there is remaining incoming order data, continues the above-described processing.

When the containers BC stop at predetermined line addresses in the picking section 83, the operation management computer 30 actuates the lifters 110 to lift the electronic balances 120 below the roller conveyor 84, and enables weighing of the containers BC at an upper side of the roller conveyor 84, and displays the numbers of articles to be picked on the display units 45 of the balance management computers 40 (S16). At this time, the support portions 121 move at portions between the rollers 85 of the roller conveyor 84 without interference.

Based on the displays on the display units 45, in the picking section 83, an operator picks and stores the merchandise in the storage container AC.

The balance management computer 40 calculates the number of merchandise picked from the container BC from the unit weight of a single merchandise by weighing, compares the calculated number with the number of incoming orders, and when there is an excess or deficiency, displays the excessive or deficient number of merchandise on the display unit 45 serving as a notification means of the balance management computer 40 (S17).

In the present embodiment, the balance management computer 40 determines whether there is an excess or deficiency by comparing the number of pickings of the articles G obtained by dividing the difference between the reference weight value and the measurement value after operation as a weight of the container BC after picking of the articles G by the unit weight with the number of incoming orders. Weights of the container BC before and after picking of the articles G are measured, so that counting accuracy is improved.

After picking is completed for correcting the excess or deficiency, the balance management computer 40 checks whether the necessary number of articles has been picked by performing weighing again. After completion, the balance management computer 40 transmits the results to the server 20 through the operation management computer 30 (S18).

After whether there is an excess or deficiency is checked by comparing the number of pickings of the articles G obtained by division by the unit weight with the number of incoming orders, when picking is completed for correcting the excess or deficiency, the operation management computer 30 actuates the lifters 110 and lowers the electronic balances 120 to enable the containers BC to be moved by the roller conveyor 84 (S19). At this time, the support portions 121 move at portions between the rollers 85 of the roller conveyor 84 without interference.

Then, the operator attaches a shipping tag to the storage container AC, and conveys the storage container AC to the loading area through the loading line 100. After completion of picking of all articles of the batch data, an operation for the next batch is started.

The container BC from which picking has been completed returns to the automated warehouse 70. The container BC from which picking will be performed again is fed to the waiting section 81 and waits.

The conveyance system of the present embodiment includes:

a conveyor line 60 as a feeding means that enables feeding of containers BC that store articles G to which article-related information is associated;

barcode readers 50 as reading means capable of reading the article-related information of the articles G assigned to the containers BC;

electronic balances 120 as weight measuring means that measure weights of the containers BC storing the articles G;

a storage unit 23 as a storage means that stores the article-related information of the articles G;

display units 45 as notification means that notifies the excessive or deficient numbers of the articles G; and an arithmetic and control unit 22 as an arithmetic control means that performs counting management and sorting control of the articles G, wherein the article-related information includes a unit weight of the articles G, the number of incoming orders of the articles G, and a reference weight value derived by measuring or calculating a weight of the container BC storing the articles G, the arithmetic and control unit 22 compares the number of pickings of the articles G obtained by dividing a difference between the reference weight value and a measurement value after operation as a weight of the container BC after picking of the articles G by the unit weight, and the number of incoming orders, determines whether there is an excess or deficiency, and when there is an excess or deficiency, notifies the excessive or deficient number of articles by the display unit 45.

According to this, even if the number of pickings is excessive or deficient, the abnormality can be notified by double-checking by weight measurement, so that the articles G can be prevented from being fed to a subsequent process while the abnormality remains.

In the container BC, the articles G of the same kind are stored.

According to this, the articles G of the same kind are stored in the container BC, and it is unnecessary to individually read barcodes attached to the articles G, so that operation man-hours and the operation time can be reduced, and the picking operation time can be shortened. In addition, upon eliminating an article mistake by attaching, for example, a barcode B associated with article-related information to the container BC storing the articles G of the same kind, the number of pickings can be prevented from becoming excessive or deficient. Further, since, for example, a barcode is assigned to the container BC, picking of the articles G to which barcodes cannot be attached can also be performed. Further, the above conveyance system reduces the work man-hours and operation time significantly since it enables an operator to confirm whether the picked article G is a desired one and whether he has picked a necessary number of the articles G, without any work on a computer constituting the conveyance system, such as touching a scanner or data entry by touching a keyboard or display.

To the picking section 83 in which the articles G are picked in the feeding means, a roller conveyor 84 is applied, and below the roller conveyor 84, lifters 110 that lift and lower the electronic balances 120 are disposed, support portions 121 capable of advancing and retreating at a portion between rollers 85 of the roller conveyor 84, and capable of supporting the container BC, are provided to extend at an upper surface side of the electronic balances 120, and the arithmetic and control unit 22 lifts the electronic balances 120 by the lifters 110 before picking of the articles G from the container BC, and the electronic balances measure weights of the container BC before and after picking of the articles G at an upper side of the roller conveyor 84.

According to this, by the configuration in which the weight of the container BC is measured at an upper side of the roller conveyor 84, without adding special equipment to the roller conveyor 84, weights of the container BC before and after picking of the articles G can be measured by a combination of existing equipment, so that the equipment investment cost can be reduced while the counting accuracy is improved.

The conveyance system of the present invention is not limited to the configuration described above. In other words, various design changes, etc., are possible without departing from the gist of the present invention.

For example, for the waiting section 81 and the alignment section 82, the configuration of the conveyance system in Japanese Patent Application No. 2018-143302 (JP No. 2020-19596 A) previously filed by the applicant of the present invention can be used.

As identification information of the container BC and identification information of the article G to be read, a barcode is used, however, OCR, RFID, and QR codes (OR code is a registered trademark), etc., can be used. In accordance with this, the reading means can be changed as appropriate.

The conveyors constituting the first feed line 80, the second feed line 90, and the loading line 100 are individually controlled, however, it is also possible that a control panel is disposed in the conveyor line 60, and instructions from the operation management computer 30 are executed through the control panel.

It is also possible that the automated warehouse 70 is configured independently from the conveyor line 60, and controlled by being connected to the operation management computer 30.

Figure 10:
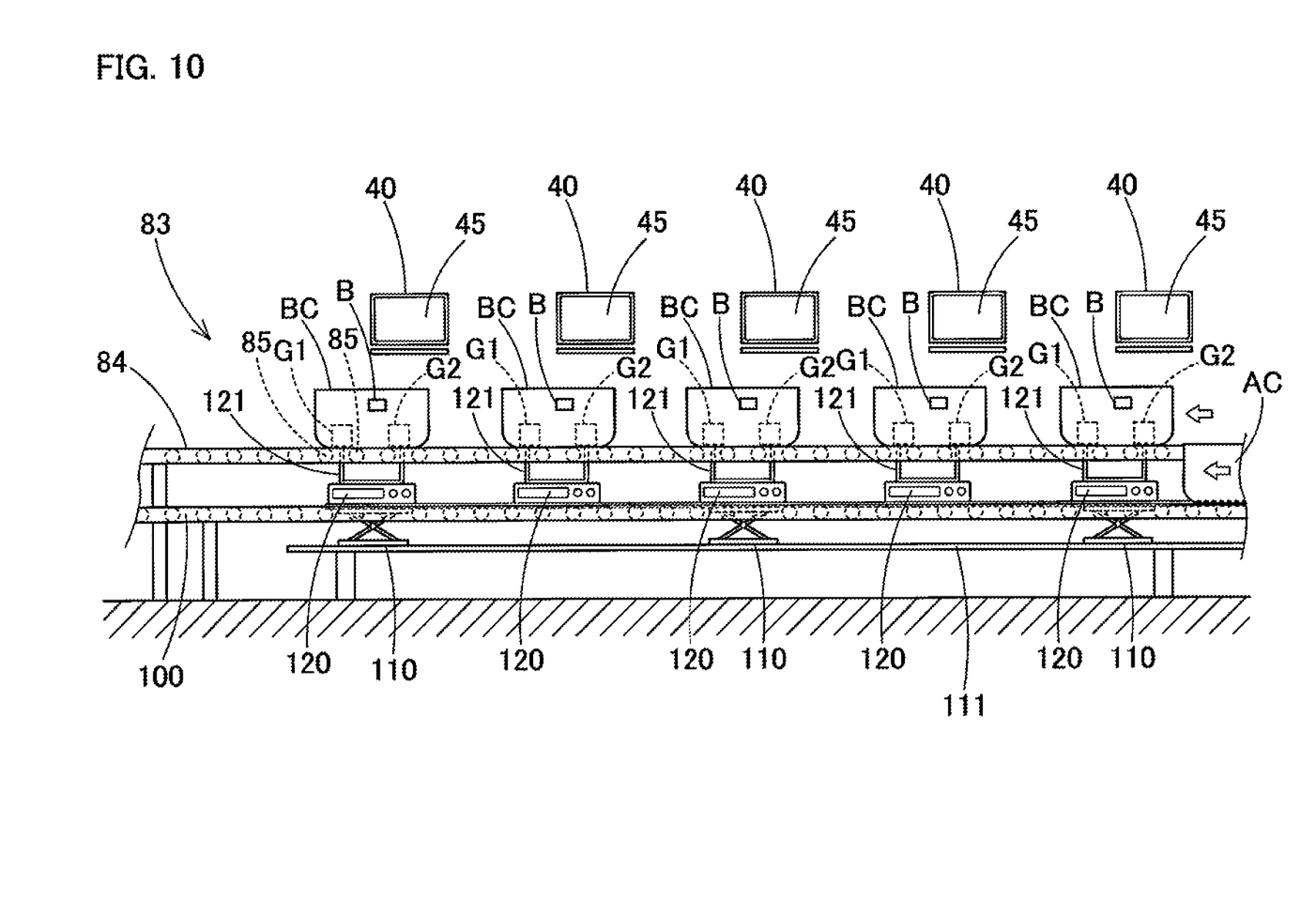
FIG. 10 is an explanatory view showing a state before the electronic balances are lifted when a plurality of kinds of articles are stored, as viewed from the direction orthogonal to the feeding direction of the picking section.
Figure 11:
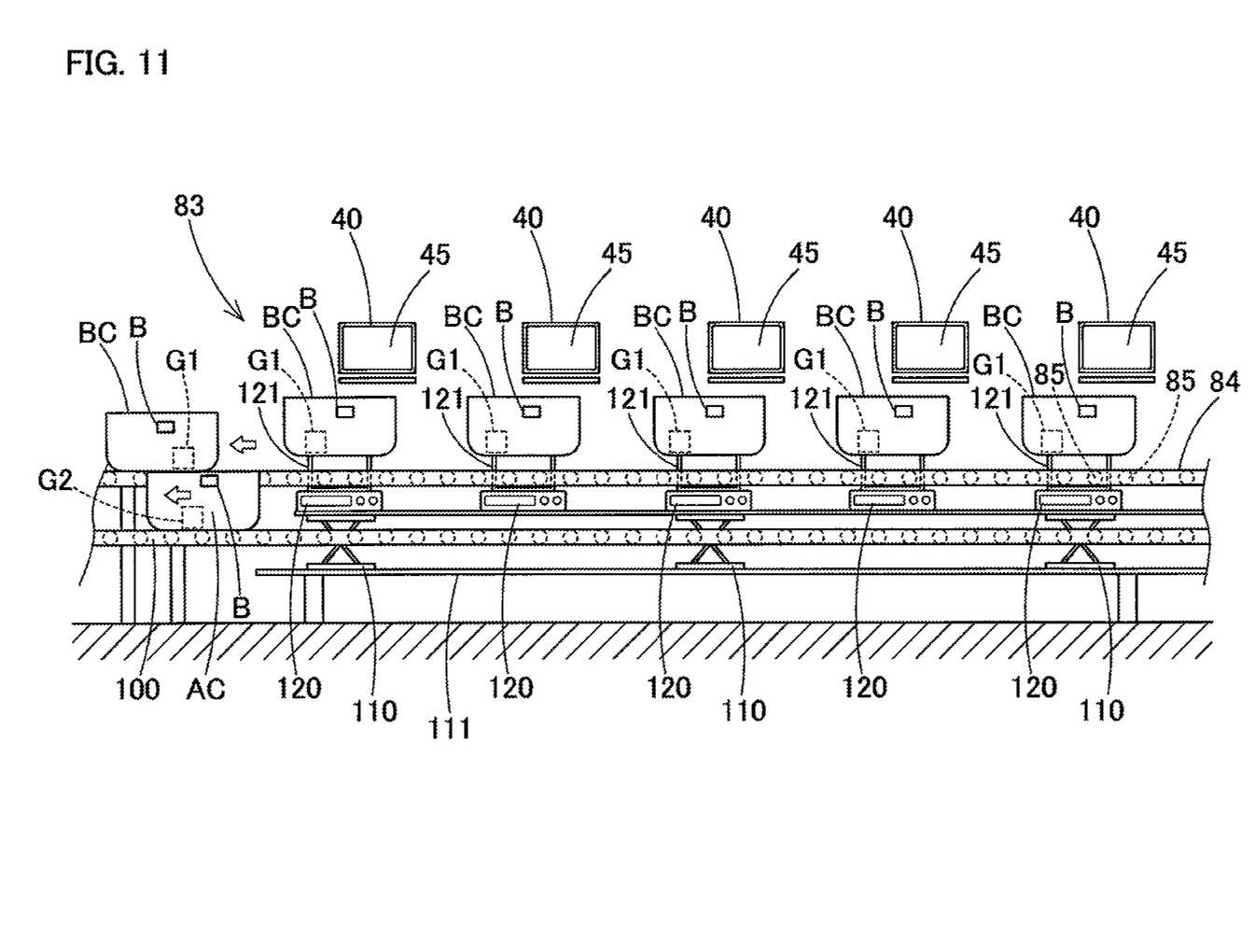
FIG. 11 is an explanatory view showing a state in which the electronic balances are lifted when a plurality of kinds of articles are stored, as viewed from the direction orthogonal to the feeding direction of the picking section.

As shown in FIGS. 10 and 11, it is also possible that a plurality of kinds of articles G1 and G2 are stored in the container BC, the numbers of the plurality of kinds of articles G1 and G2 to be picked are displayed on the display unit 45 of the balance management computer 40, and from unit weights of single articles G1 and G2 obtained by weighing, the numbers of articles G1 and G2 picked from the container BC are calculated, and compared with the numbers of incoming orders, and when there are excesses or deficiencies, the excessive or deficient numbers of articles are respectively displayed on the display unit 45 of the balance management computer 40.

The waiting section 81 consists of four parallel conveyors, however, according to conditions such as the number of incoming orders, stock quantity, and shipping destinations, etc., it is also possible that the section consists of any number of conveyors other than four, a plurality of conveyors with different heights in the up-down direction.

The number of pickings and the excessive or deficient number when the number of pickings is excessive or deficient are displayed on the display unit 45 of the balance management computer 40, however, it is also possible to issue instructions by using a voice output means such as a speaker, or to issue instructions by combining display on the display unit 45 and voice by a voice output means.

What is claimed is:

1. A conveyance system comprising:
a feeding means that enables feeding of containers that store articles to which article-related information is associated;
a reading means capable of reading the article-related information of the articles assigned to the container;
a weight measuring means that measures a weight of the container storing the articles;
a storage means that stores the article-related information of the articles;
a notification means that notifies an excessive or deficient number of the articles; and
an arithmetic control means that performs counting management and sorting control of the articles, wherein
the article-related information includes a unit weight of the articles, the number of incoming orders of the articles, and a reference weight value derived by measuring or calculating a weight of the container storing the articles,
the arithmetic control means compares
a number of pickings of the articles obtained by dividing a difference between the reference weight value and a measurement value after operation as a weight of the container after picking of the articles by the unit weight, and
the number of incoming orders,
determines whether there is an excess or deficiency, and when there is an excess or deficiency, notifies the excessive or deficient number of articles by the notification means.

2. The conveyance system according to claim 1, wherein in the container, articles of the same kind are stored.

3. The conveyance system according to claim 2, wherein to a region in which the articles are picked in the feeding means, a roller conveyor is applied, and
below the roller conveyor, a lifting and lowering means that lifts and lowers the weight measuring means is disposed,
a support portion capable of advancing and retreating at a portion between rollers of the roller conveyor, and capable of supporting the container, is provided to extend at an upper surface side of the weight measuring means, and
the arithmetic control means
lifts the weight measuring means by the lifting and lowering means before picking of the articles from the container, and the weight measuring means measures weights of the container before and after picking of the articles at an upper side of the roller conveyor.

* * * * *